US011882424B2

(12) United States Patent
Ha

(10) Patent No.: US 11,882,424 B2
(45) Date of Patent: Jan. 23, 2024

(54) SPEAKER DRIVER FROM WHICH SURROUNDING HAS BEEN OMITTED

(71) Applicant: GOOD NETWORKS CO., LTD., Changwon-si (KR)

(72) Inventor: Jung Soo Ha, Goyang-si (KR)

(73) Assignee: GOOD NETWORKS CO., LTD., Changwon-si (KR)

( * ) Notice: Subject to any disclaimer, the term of this patent is extended or adjusted under 35 U.S.C. 154(b) by 337 days.

(21) Appl. No.: 17/420,950

(22) PCT Filed: Feb. 8, 2021

(86) PCT No.: PCT/KR2021/001606
§ 371 (c)(1),
(2) Date: Jul. 6, 2021

(87) PCT Pub. No.: WO2022/139065
PCT Pub. Date: Jun. 30, 2022

(65) Prior Publication Data

US 2022/0408194 A1 Dec. 22, 2022

(30) Foreign Application Priority Data

Dec. 21, 2020 (KR) ........................ 10-2020-0180232

(51) Int. Cl.

| | |
|---|---|
| ***H04R 9/06*** | (2006.01) |
| ***H04R 3/00*** | (2006.01) |
| ***H04R 9/02*** | (2006.01) |
| ***H04R 9/04*** | (2006.01) |

(52) U.S. Cl.
CPC ................. *H04R 9/06* (2013.01); *H04R 3/00* (2013.01); *H04R 9/025* (2013.01); *H04R 9/046* (2013.01)

(58) Field of Classification Search
CPC .......... H04R 9/06; H04R 9/025; H04R 9/046; H04R 3/00
See application file for complete search history.

(56) References Cited

U.S. PATENT DOCUMENTS

| | | | | |
|---|---|---|---|---|
| 2017/0118560 A1* | 4/2017 | Lucas | ................... | F16F 1/3842 |
| 2018/0192217 A1 | 7/2018 | Hogan et al. | | |
| 2019/0045306 A1* | 2/2019 | Palmer | ................. | H04R 31/003 |
| 2022/0201385 A1* | 6/2022 | Corynen | ................ | H04R 1/288 |

FOREIGN PATENT DOCUMENTS

| | | |
|---|---|---|
| KR | 10-0994717 B1 | 11/2010 |
| KR | 10-1273734 B1 | 6/2013 |
| KR | 10-1690221 B1 | 12/2016 |
| KR | 10-1991630 B1 | 6/2019 |

* cited by examiner

*Primary Examiner* — Jason R Kurr
(74) *Attorney, Agent, or Firm* — Bridgeway IP Law Group, PLLC; Jihun Kim

(57) ABSTRACT

Disclosed is a speaker driver from which surrounding (suspension) has been omitted, including a magnet unit disposed in a set form, a vibration unit disposed adjacent to the magnet unit and generating a sound through vibration, and a winding unit disposed between the magnet unit and the vibration unit in a winding shape, generating magnetism in a first direction or a second direction which is a direction opposite to the first direction when power is applied to the winding unit, and vibrating the vibration unit by applying, to the vibration unit, a force generated in association with magnetism of the magnet unit.

11 Claims, 12 Drawing Sheets

SPEAKER DRIVER FROM WHICH SURROUNDING HAS BEEN OMITTED

TECHNICAL FIELD

The present invention relates to a speaker driver, and more particularly, to a speaker driver in which an element of surrounding that limits a movement of a diaphragm is minimized by constructing a structure from which the surrounding (suspension) supporting the diaphragm has been omitted, unlike in the existing moving coil driver structure.

BACKGROUND ART

An audible frequency (20 Hz to 20 kHz) is characterized in that when the same power is applied, the speed of vibration within the audible frequency is reduced and the width thereof is widened as the audible frequency becomes closer to 20 Hz and the speed of the vibration is increased and the width thereof is narrowed as the audible frequency becomes closer to 20 kHz. Accordingly, the existing moving coil speaker driver has limits in playing back low frequency portion of the speaker because surrounding limits a vibration motion of a diaphragm.

FIG. 1 is a cross-sectional view of a conventional speaker. The speaker includes a permanent magnet 20, a voice coil 30, and a suspension 50 disposed within a housing 40, and a diaphragm 10 which has a cone shape and protruded from one side of the housing 40 to the outside.

As may be seen from FIG. 1, the voice coil 30 is disposed at the center of the permanent magnet 20, and the suspension 50 is disposed between the voice coil 30 and the diaphragm 10. When an electric signal is applied to the voice coil 30, the voice coil 30 becomes an electromagnet. As a result, the coil applies a force to the diaphragm 10 by a well known law of physics, thereby generating a sound by vibrating the diaphragm 10.

If the diaphragm 10 rapidly vibrates at a short reciprocating distance, a high frequency is generated. If the diaphragm 10 slowly vibrates at a long reciprocating distance, a low frequency is generated. In this process, the voice coil 30 may deviate from a set location. In order to position the coil 30 and prevent the deviation of the voice coil 30 attributable to the vibration, the suspension 50 operates to position the voice coil 30 and prevent the coil 30 from being deviated from a set location.

However, there is a problem in the playback quality of a low frequency is degraded due to the presence of the suspension 50 necessarily present in the voice coil 30. If the movement range of a low frequency sound source which applied to the voice coil 30 and the diaphragm 10 exceeds a movement range of the suspension, the suspension 50 acts as an obstacle.

In order to solve the problem, a 2-way speaker including a crossover network was developed. In general, the 2-way speaker is a speaker including a tweeter and a woofer, and is a speaker differently vibrating depending on the number of vibrations. That is, the 2-way speaker vibrates through the tweeter in the case of a high frequency, and the woofer vibrates in the case of a low frequency.

However, the 2-way speaker also does not prevent the degradation of sound quality. The reason for this is that the overlap of frequencies that occur in the crossover network. That is, a phase shift occurs because an overlap portion is included in a portion where a high frequency and a low frequency are divided. Furthermore, there is a problem in that quality of the 2-way speaker is degraded due to a harmonic distortion occurring in the filter of the crossover network.

Another problem of a conventional speaker is that they only partially utilize the vibrations of the diaphragm.

In general, the conventional speaker has a structure in which a sound generated from the rear of the diaphragm is absorbed by sound-absorbing materials disposed within an enclosure or discharged through a hole formed in some of the enclosure.

In such a case, there is a problem in that only front portion of sounds generated from the diaphragm that vibrates forward or backward is used. This also becomes a factor in degrading quality of a sound.

DISCLOSURE

Technical Problem

The present invention has been made to solve the above problems, and an object of the present invention is to provide a speaker having improved sound quality by providing a speaker driver having a new structure rather than a conventional moving coil driver.

Technical Solution

A speaker driver from which surrounding has been omitted according to the present invention includes a magnet unit disposed in a set form, a vibration unit disposed adjacent to the magnet unit and generating a sound through vibration, and a winding unit disposed between the magnet unit and the vibration unit in a winding shape, generating magnetism in a first direction or a second direction which is a direction opposite to the first direction when power is applied to the winding unit, and vibrating the vibration unit by applying, to the vibration unit, a force generated in association with magnetism of the magnet unit.

An installation unit is formed at a set location of the vibration unit. A tilt connection unit is disposed in the installation unit. When power is supplied to the winding unit, the vibration unit is tilted based on the fixing unit.

The vibration unit includes a main part whose one surface or the other surface have a symmetrical shape and an extension part connected to the main part and having a shape elongated in one direction. The installation unit is formed in the extension part.

The installation unit includes a hole penetrating the vibration unit. The fixing unit is disposed to penetrate the hole.

An arrangement unit is formed at a location of the vibration unit facing the magnet unit. The winding unit is disposed in the arrangement unit.

The magnet unit is formed in a round form.

Any one of the magnet unit or the winding unit is disposed within the other of the magnet unit or the winding unit. The vibration unit includes extension parts in parallel elongated from locations isolated from each other. The extension parts are formed in a way that a force of the winding unit is applied to the extension parts.

The vibration unit includes a length unit connected to between the extension parts. The winding unit is disposed in a form surrounding the length unit. The magnet unit is disposed in a form surrounding the winding unit.

The vibration unit is configured to be tilted based on the length unit.

An arrangement unit is formed on one side of the vibration unit. The magnet unit and the winding unit are disposed in the arrangement unit. When power is applied, a force is applied to the arrangement unit so that the vibration unit vibrates.

The magnet unit includes a first magnet unit and a second magnet unit. The size of the second magnet unit is greater than the size of the first magnet unit so that a space where the first magnet unit is disposed is formed. The winding unit is positioned between the first magnet unit and the second magnet unit.

The speaker driver further includes a controller controlling the size of the power for the winding unit.

The controller supplies, to the winding unit, power corresponding to a zero-point control signal by applying the zero-point control signal to the winding unit in order to guide a location of the vibration unit.

Advantageous Effects

The present invention can provide the speaker having high quality, in particular, in a low frequency region because a movement of the vibration unit is not hindered due to the absence of a suspension.

Furthermore, the present invention can provide the speaker which is small and can sufficiently secure a distance in which the vibration unit can vibrate.

Furthermore, the present invention can provide the speaker capable of generating a high-quality sound by using all of the sounds generated in all directions due to vibration of the vibration unit.

BEST MODE FOR INVENTION

Figure 1:
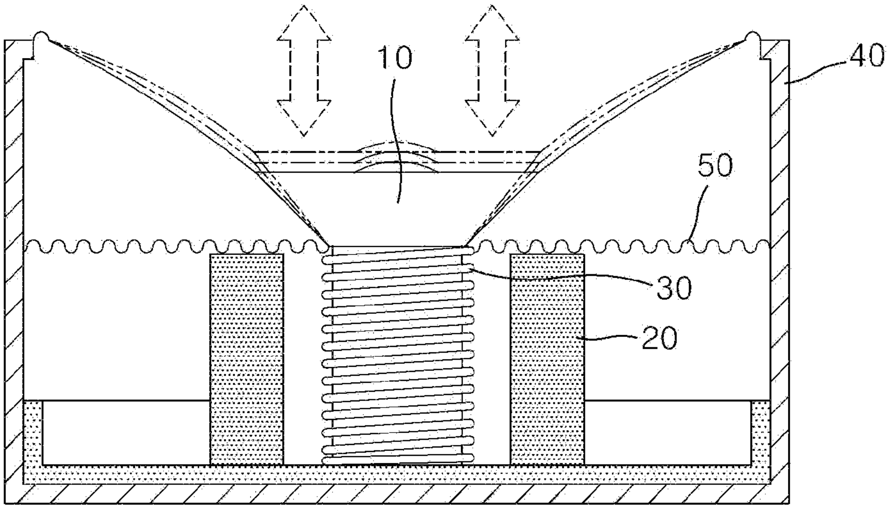
FIG. 1 Prior Art
FIG. 1 is a cross-sectional view of a conventional speaker.

Hereinafter, embodiments of the present invention are described in detail with reference to illustrative drawings. However, this is not intended to limit the scope of the present invention.

In adding reference numerals to the components of each drawing, it should be noted that the same components have the same reference numerals as much as possible even if they are displayed in different drawings. Furthermore, in describing the present invention, when it is determined that the detailed description of the related well-known configuration or function may obscure the gist of the present invention, the detailed description thereof will be omitted.

Furthermore, the size or shape of an element shown in the drawings may have been enlarged for the clarity of a description and for convenience' sake. Furthermore, terms specifically defined by taking into consideration the configuration and operation of the present invention are merely for illustrating the embodiments of the present invention and do not limit the scope of rights of the present invention.

A speaker driver from which surrounding (suspension) has been omitted according to the present invention is characterized in that a suspension has been omitted from the speaker driver.

Figure 2:
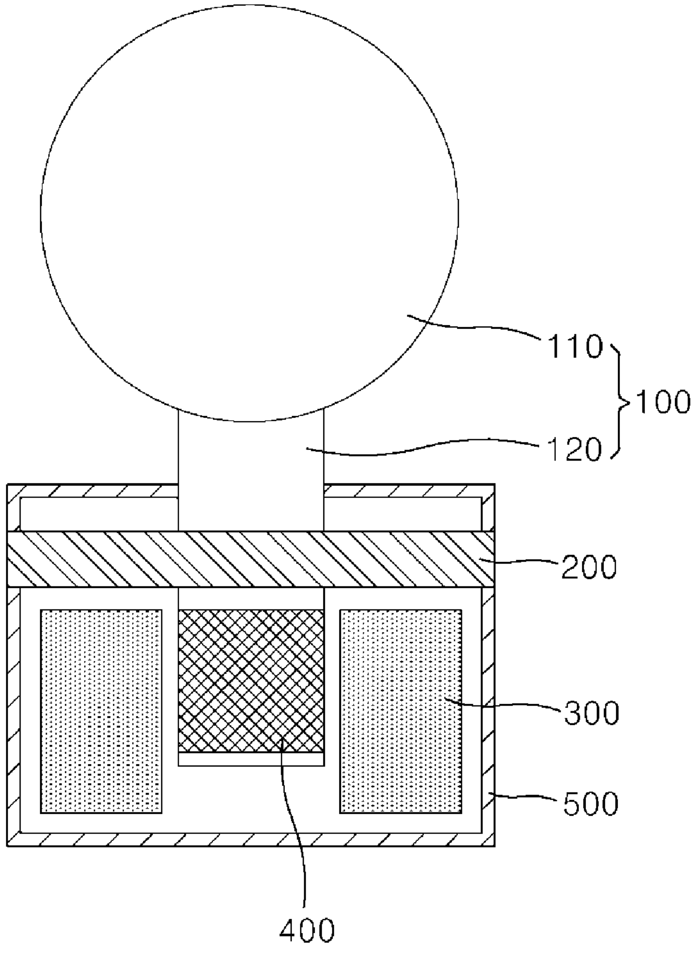
FIG. 2 is a front cross-sectional view of a speaker driver from which surrounding (suspension) has been omitted according to a first embodiment of the present invention.

FIG. 2 is a front cross-sectional view of a speaker driver from which surrounding (suspension) has been omitted according to a first embodiment of the present invention.

Figure 3:
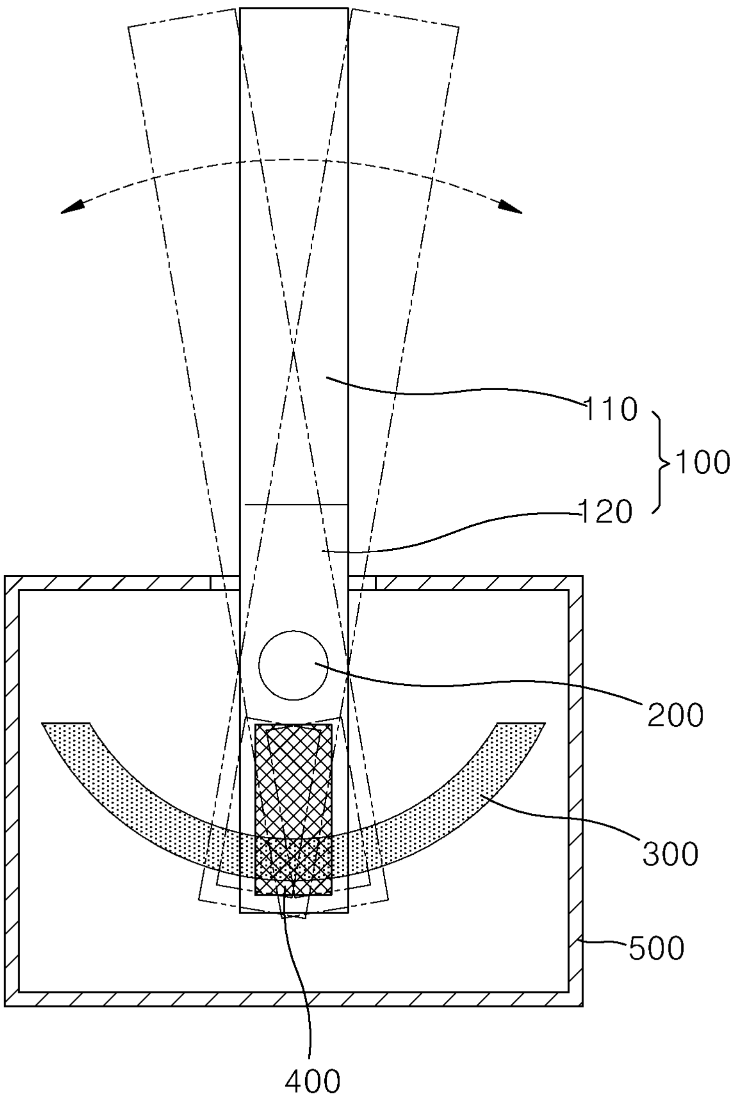
FIG. 3 is a side cross-sectional view of the speaker driver from which surrounding (suspension) has been omitted according to the first embodiment of the present invention.

FIG. 3 is a side cross-sectional view of the speaker driver from which surrounding (suspension) has been omitted according to the first embodiment of the present invention.

The speaker driver from which surrounding (suspension) has been omitted according to the first embodiment of the present invention is as follows.

The speaker driver from which surrounding (suspension) has been omitted according to the present invention includes a magnet unit 300, a vibration unit 100, and a winding unit 400.

The magnet unit 300 permanently forms magnetism. It is preferred that the magnet unit 300 is provided in plural number. The magnet units 300 provided in plural number are isolated from each other.

It is preferred that at least some of the vibration unit 100 is disposed between the magnet units 300 isolated from each other. The vibration unit 100 may consist of a main part 110 and an extension part 120.

The main part 110 may be formed to have a shape in which the front and the rear thereof are symmetrical or asymmetrical. For example, the main part 110 may be formed to have a cylindrical shape. However, the shape of the main part 110 is not limited to a circle. It is not problematic if the front and rear of the main part 110 have an equal or inequal form. For example, the main part 110 may be formed to have a shape, that is, a circle or some of a circle, a polygon such as a triangle or a rectangle, a shape having various forms of faces, a sphere, a polyhedron, or various three-dimensional shapes.

The extension part 120 is elongated and formed from the bottom of the main part 110. In this case, the extension part 120 may have a hexahedral shape. The extension part 120 has a set length, and may be disposed between the magnet units 300 isolated from each other.

An installation unit may be formed between the main part 110 and the extension part 120. In this case, it is preferred that the installation unit is formed in the extension part 120. That is, the installation unit may be formed at a location where a shape of the main part 110 is not damaged. The installation unit may be a hole, for example. The installation unit is formed in a form that penetrates the extension part 120. The installation unit may be formed in a form that penetrates the extension part 120 in a direction that intersects a length direction of the extension part 120, not the length direction. If the vibration unit 100 is disposed at its home position, it is preferred that the installation unit is disposed at a location where the vibration unit 100 does not face the magnet unit 300.

A tilt connection unit 200 may be disposed in the installation unit.

The tilt connection unit 200 is disposed in the installation unit, and may play a role as a reference when the vibration unit 100 vibrates. That is, the vibration unit 100 is configured to be tilted based on the tilt connection unit 200 like a seesaw. The type of tilt connection unit 200 is not problematic if the tilt connection unit 200 has only to play a role as a reference for the fixing and tilting of the vibration unit 100. For example, the tilt connection unit 200 may be a pole disposed to penetrate the installation unit. If not, the tilt connection unit 200 may be a connection member that supports the installation unit in a way to rotate on one side and the other side of the installation unit.

That is, the type of tilt connection unit 200 is not problematic if the vibration unit 100 can be tilted based on the installation unit.

Furthermore, an arrangement unit may be formed in the tilt connection unit 200. The arrangement unit may be a hole formed to have a set size.

The winding unit 400 may be disposed between the magnet units 300 in a winding form. The winding unit 400 may be fabricated using a member, such as copper through which a current can flow. The winding unit 400 may be disposed in the arrangement unit. The winding unit 400 may move a current in a winding direction when power is applied thereto, thus becoming an electromagnet. In this case, a direction of magnetism of the winding unit 400 may be changed depending on the direction of the power.

In this case, a force may be generated in a direction that intersects the direction of magnetism and the direction of a current due to the direction of magnetism formed by the winding unit 400, the direction of magnetism formed by the magnet units 300, and the direction of the current. The force may be delivered to the vibration unit 100. Therefore, the vibration unit 100 may be moved by the force in a first direction or a second direction with respect to the tilt connection unit 200.

In this case, it is to be noted that in the description of the speaker driver from which surrounding (suspension) has been omitted according to the first embodiment, each of the first direction and the second direction means only its directivity. That is, it is to be noted that each of the first direction and the second direction does not denote a specific fixed direction.

That is, the first direction may mean both the front and the rear, that is, specific directions. Furthermore, the second direction needs to be interpreted in a relation with the first direction. The reason for this is that if the first direction or the second direction is interpreted as being fixed, a problem may occur when movements of the main part 110 and the extension part 120 are interpreted.

For example, if the first direction is interpreted as being the right based on FIG. 2, an expression that the vibration unit 100 moves in the first direction may mean that the extension part 120 moves to the right. However, the main part 110 configured on the upper side of the vibration unit 100 may move in the second direction, that is, the left. Locations where the extension part 120 and the main part 110 are tilted are different because the vibration unit 100 according to the first embodiment is tilted based on the tilt connection unit 200. Therefore, in the description of the first embodiment of the present invention, if the vibration unit 100 moves in the first direction, this may mean that the main part 110 moves to the left and the extension part 120 moves to the right, which may be the opposite in the case of the second direction.

Meanwhile, in the present invention, the vibration unit 100 moves and vibrates at a long distance because the vibration unit 100 vibrates as described above, thereby being capable of improving sound quality in a low frequency, in particular. That is, the vibration unit 100 does not move at a straight-line distance, but performs a pendulum movement with respect to the tilt connection unit 200 and thus may move and vibrate at a long distance.

When power is applied, the extension part 120 may move in the first direction or the second direction. At this time, the extension part 120 may move at a set distance according to the power because a movement of the extension part 120 is not hindered by a suspension. The main part 110 may also move in the first direction or the second direction in response thereto.

Furthermore, in the present invention, one surface and the other surface of the main part 110 have a symmetrical shape. Vibration occurring in response to a movement of the extension part 120 is delivered to the main part 110 without any change. A sound can be generated from the main part 110 in all directions without being hindered. Accordingly, quality of a sound can be improved.

In this case, it is preferred that the magnet unit 300 of the present invention is formed to be rounded. More accurately, it is preferred that the magnet unit 300 is formed in the form of some of a semicircle or a circle. Therefore, the vibration unit 100 may basically move in the first direction or the second direction with respect to the tilt connection unit 200.

Figure 4:
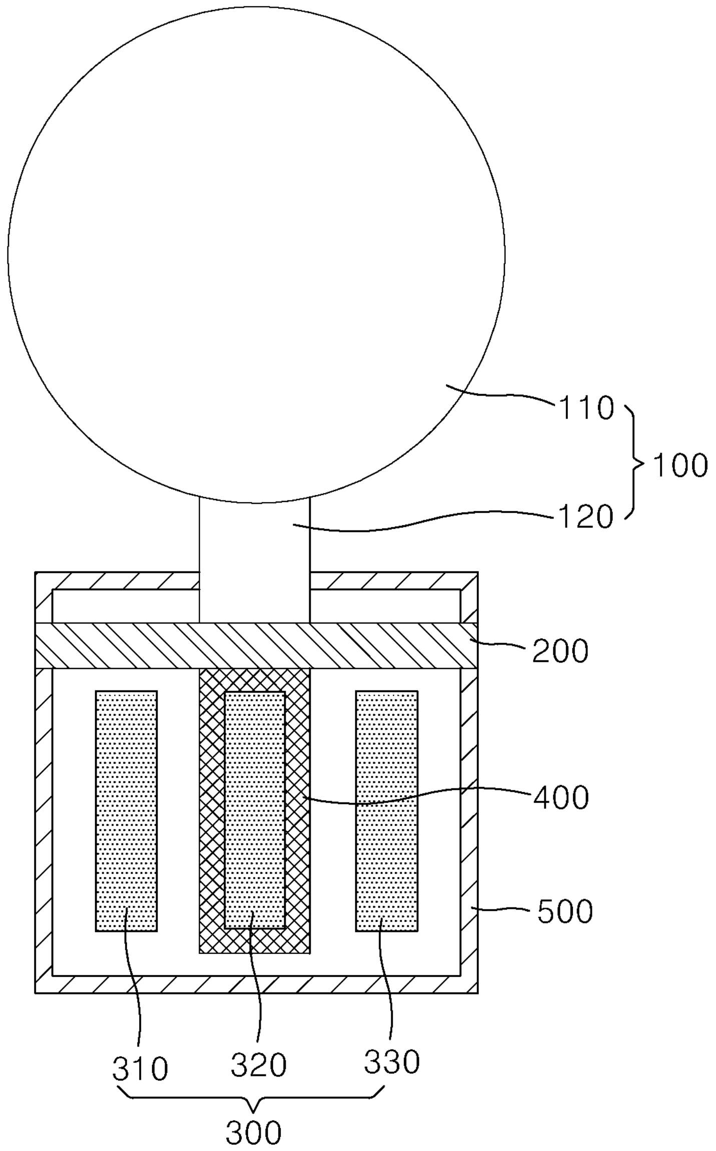
FIG. 4 is a front cross-sectional view of a speaker driver from which surrounding (suspension) has been omitted according to a second embodiment of the present invention.

FIG. 4 is a front cross-sectional view of a speaker having improved sound quality according to a second embodiment of the present invention.

In the speaker having improved sound quality according to the second embodiment of the present invention, the magnet unit 300 may be further added differently from that of the first embodiment. The magnet unit 300 may consist of a first magnet unit 310, a second magnet unit 320, and a third magnet unit 330. The first magnet unit 310, the second magnet unit 320, and the third magnet unit 330 may be sequentially disposed. The first magnet unit 310 and the third magnet unit 330 may have the same magnetism, and the second magnet unit 320 may have the same or different magnetism.

The second magnet unit 320 may be disposed in the arrangement unit. In this case, the arrangement unit is limited to a hole. It is not problematic if the second magnet unit 320 has a form in which a hole is formed in the extension part 120 and the second magnet unit 320 is inserted into the hole. Furthermore, in the winding unit 400, the second magnet unit 320 may be disposed at a location where the second magnet unit 320 faces each of the first magnet unit 310 and the third magnet unit 330. That is, the winding unit 400 may be disposed at least on one side and the other side of the second magnet unit 320.

More accurately, a hole having a rectangular shape may be formed in the extension part 120. The second magnet unit 320 having a semicircle shape has a "U" shape or a form having some of a circle when being monitored from the side, but may be in a rectangle or circle or polygon shape when only a cross section thereof is checked. Accordingly, the second magnet unit 320 may be inserted into the extension part 120. Furthermore, the winding unit 400 may be disposed based on the hole of the extension part 120. That is, the winding unit 400 may be disposed in a form in which the circumference of the hole surrounds the front and rear of the extension part so that the hole of the extension part 120 is not closed.

Accordingly, in the present invention, as power is supplied to the winding unit 400, the extension part 120 is formed to slide and reciprocate along the second magnet unit 320. That is, the extension part 120 may slide and move in a "U" form along the "U"-shaped second magnet unit 320. The main part 110 may also vibrate in response to such a "U"-shaped sliding movement of the extension part 120.

In this case, each of the first magnet unit 310 and the third magnet unit 330 may have the same semicircle shape as the magnet unit 300 according to the first embodiment. The second magnet unit 320 may have a semicircle shape, but is not formed in the semicircle shape.

An operation of the speaker having improved sound quality according to the second embodiment is the same as that according to the first embodiment. That is, when power is supplied to the winding unit 400, a force is delivered to the vibration unit 100. The vibration unit 100 may vibrate and generate a sound.

Figure 5:
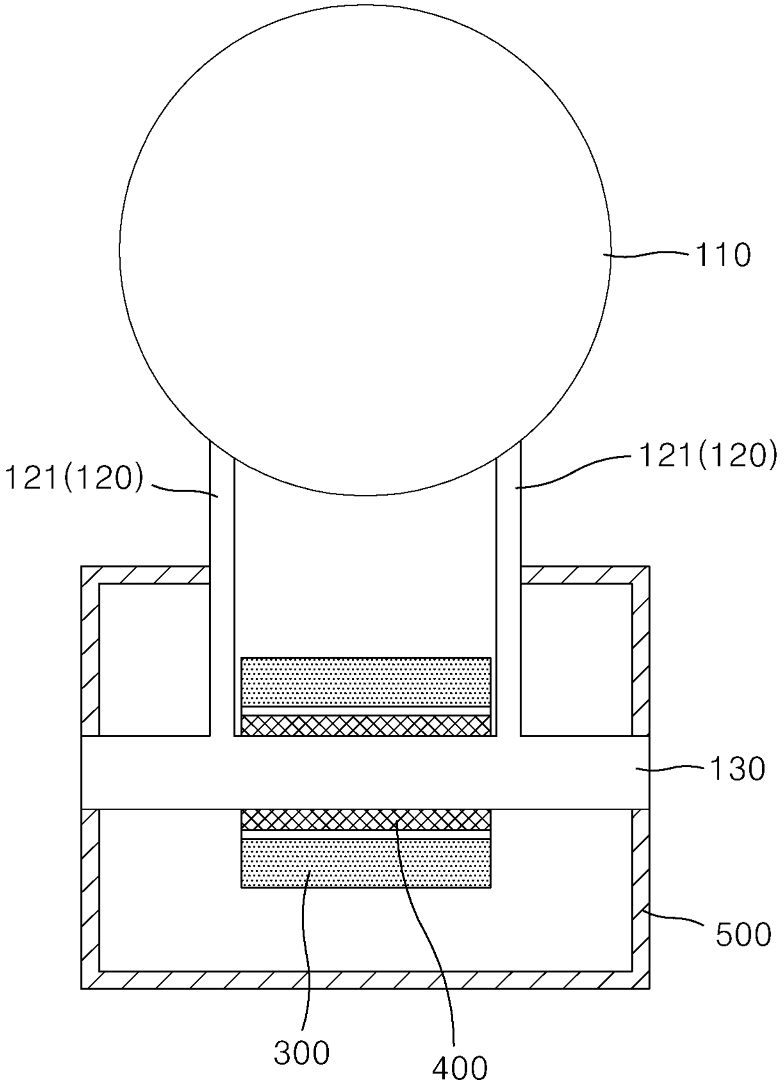
FIG. 5 is a front cross-sectional view of a speaker driver from which surrounding (suspension) has been omitted according to a third embodiment of the present invention.

FIG. 5 is a front cross-sectional view of a speaker having improved sound quality according to a third embodiment of the present invention.

Figure 6:
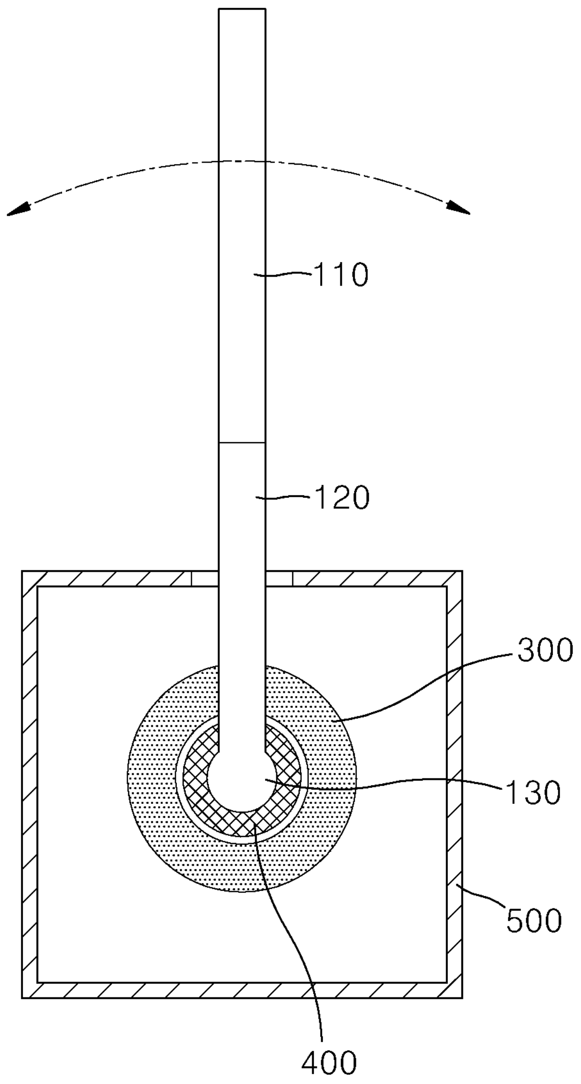
FIG. 6 is a side cross-sectional view of the speaker driver from which surrounding (suspension) has been omitted according to the third embodiment of the present invention.

FIG. 6 is a side cross-sectional view of a speaker having improved sound quality according to the third embodiment of the present invention.

The third embodiment of the present invention has the same operating principle and construction as the first embodiment and the second embodiment, but may be different from the first embodiment and the second embodiment in an arrangement relation between elements.

In the construction of the vibration unit 100 according to the third embodiment of the present invention, the main part 110 and the extension part 120 may be the same as those of the first embodiment and the second embodiment. However, in the vibration unit 100 according to the third embodiment, two extension parts 120 may be isolated and disposed from the main part 110.

Referring to FIG. 5, the extension part 120 may include a first extension part 121 and a second extension part 122. The first extension part 121 and the second extension part 122 may be downward elongated from locations where the first and second extension parts are isolated from each other in the main part 110.

Furthermore, a length unit 130 may be connected to and disposed in the first extension part 121 and the second extension part 122. The length unit 130 has a set length. Accordingly, the first extension part 121, the second extension part 122, and the length unit 130 may form a closed circuit shape along with the main part 110.

A structure in which the winding unit 400 and the magnet unit 300 are stacked may be disposed in the length unit 130. That is, any one of the magnet unit 300 or the winding unit 400 may be disposed adjacent to the length unit 130, and the other thereof may be disposed in the disposed construction. However, it is hereinafter assumed that the winding unit 400 is disposed closer to the length unit 130 than to the magnet unit 300, for convenience of description. The present invention is not limited to a connection relation between such elements.

The winding unit 400 is disposed in a form that surrounds the length unit 130. The winding unit 400 is wound in the entire length direction of the length unit 130, and may be disposed in the circumference of the length unit 130. The magnet unit 300 may be disposed in a form that surrounds the winding unit 400. That is, when the construction of the present invention is described from the center of the present invention to the outside thereof, the length unit 130, the winding unit 400, and the magnet unit 300 may be sequentially monitored.

The length unit 130 may play the same role as the tilt connection unit 200 according to the first embodiment. That is, the length unit 130 may become a reference for the tilting of the vibration unit 100. When power is supplied, the vibration unit 100 may tilt and vibrate in the first direction or the second direction. That is, when power is applied to the winding unit 400, the winding unit 400 applies a force to the vibration unit 100 in the direction in which the power is applied so that the vibration unit 100 can move in the first direction or the second direction.

When the force is applied to the vibration unit 100, the vibration unit 100 may tilt in the first direction or the second direction by using the length unit 130 as an axis. In this case, the vibration unit 100 may tilt and vibrate at a greater angle in the case of a low frequency.

The vibration unit 100 according to the third embodiment of the present invention may tilt and vibrate based on the length unit 130 and tilts as much as a size corresponding to power. Accordingly, a high-quality sound can be generated.

Figure 7:
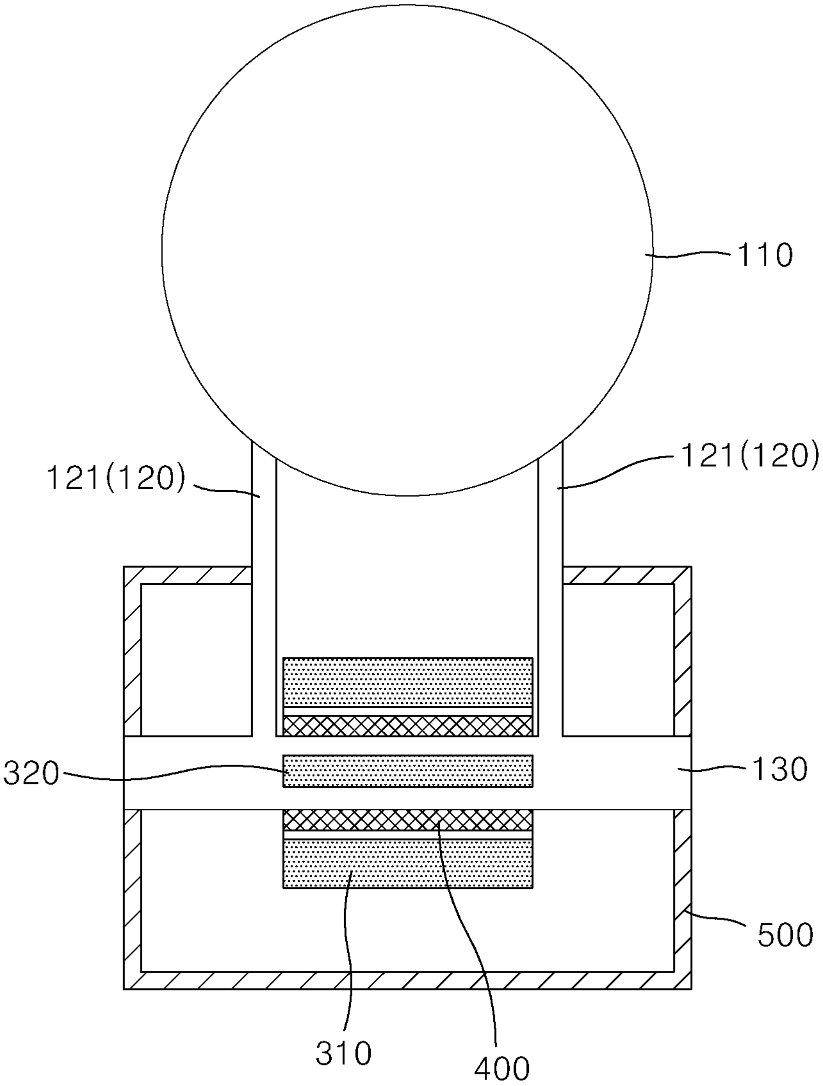
FIG. 7 is a front cross-sectional view of a speaker driver from which surrounding (suspension) has been omitted according to a fourth embodiment of the present invention.

FIG. 7 is a front cross-sectional view of a speaker driver from which surrounding (suspension) has been omitted according to a fourth embodiment of the present invention.

The speaker driver from which surrounding (suspension) has been omitted according to the fourth embodiment of the present invention has been applied from the third embodiment.

According to the fourth embodiment, the magnetism unit 300 may include a first magnetism unit 310 and a second magnetism unit 320. In this case, the first magnetism unit 310 and the second magnetism unit 320 are distinguished for convenience of description, and the present invention is not restricted by a first and a second.

The first magnetism unit 310 may be disposed in a form that surrounds the winding unit 400, like the magnetism unit 300 of the third embodiment. The second magnetism unit 310 may be disposed within the length unit 130 unlike in the third embodiment, and may generate permanent magnetism. The second magnetism unit 310 assists an operation of the winding unit 400, and may further facilitate the vibration of the main part 110. It is preferred that the second magnetism unit 310 is formed to have a set length. In this case, the length of the second magnetism unit 310 may be smaller than, equal to or longer than the length of the first magnetism unit depending on an embodiment. The length the second magnetism unit may be variously changed depending on an embodiment.

Figure 8:
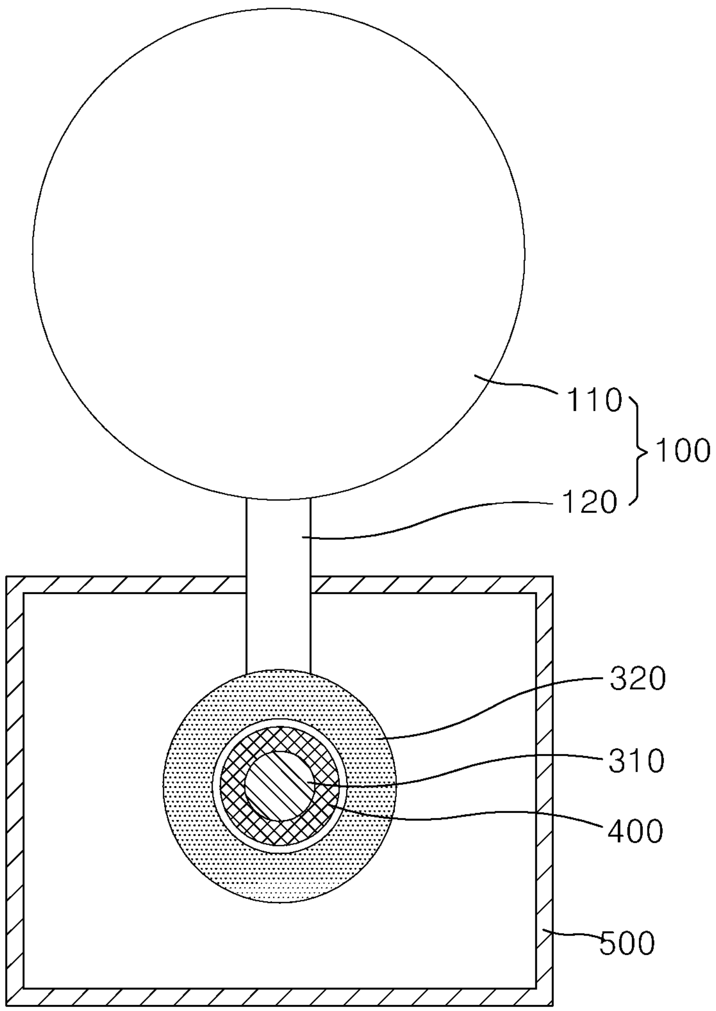
FIG. 8 is a front cross-sectional view of a speaker driver from which surrounding (suspension) has been omitted according to a fifth embodiment of the present invention.

FIG. 8 is a front cross-sectional view of a speaker driver from which surrounding (suspension) has been omitted according to a fifth embodiment of the present invention.

Figure 9:
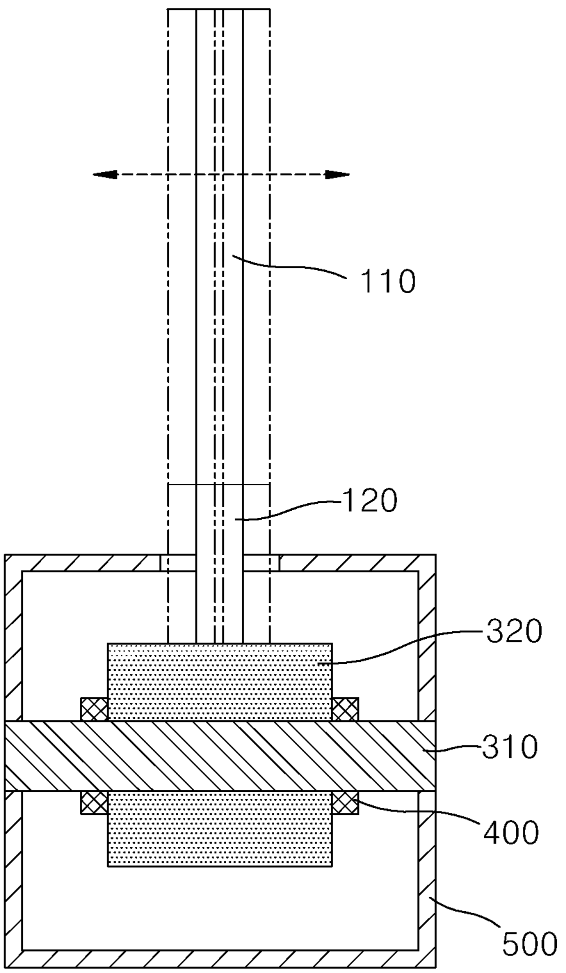
FIG. 9 is a side cross-sectional view of the speaker driver from which surrounding (suspension) has been omitted according to the fifth embodiment of the present invention.

FIG. 9 is a side cross-sectional view of the speaker driver from which surrounding (suspension) has been omitted according to the fifth embodiment of the present invention.

The speaker driver from which surrounding (suspension) has been omitted according to the fifth embodiment of the present invention has an operating principle and construction similar to those of the speaker driver from which surrounding (suspension) has been omitted according to the first to third embodiments, but may have an arrangement relation between elements, which is different from that of the first to third embodiments.

A magnet unit 300 of the speaker driver from which surrounding (suspension) has been omitted according to the fifth embodiment consists of a first magnet unit 310 and a second magnet unit 320.

The size of any one of the first magnet unit 310 or the second magnet unit 320 is formed to have a size capable of accommodating the other of the first magnet unit 310 or the second magnet unit 320. Hereinafter, a case where the size of the second magnet unit 320 is greater than the size of the second magnet unit 320 is described as an embodiment, for convenience of description.

The second magnet unit 320 may be disposed to have a larger diameter than the first magnet unit 310. It is preferred that the second magnet unit 320 and the first magnet unit 310 are disposed to have a symmetrical shape, and the shape may be a cylindrical shape, for example. A hollow unit may be formed in the second magnet unit 320. The hollow unit of the second magnet unit 320 is formed to have a size at least greater than the size of the first magnet unit 310. The first magnet unit 310 may be disposed in the hollow unit of the second magnet unit 320.

The first magnet unit 310 is configured to have its location fixed. The winding unit 400 is disposed between the second magnet unit 320 and the first magnet unit 310. In this case, the winding unit 400 is connected to the second magnet unit 320. The second magnet unit 320 is disposed to slide and move with respect to the first magnet unit 310. When power is applied to the winding unit 400, the second magnet unit 320 may move in the first direction or the second direction by a force according to the power. The vibration unit 100 may be disposed to be connected to the second magnet unit 320. Accordingly, when power is applied, the vibration unit 100 may move and vibrate in a straight line in the first direction or the second direction in response to a movement of the second magnet unit 320, so that a sound may be generated in response to the vibration.

Figure 10:
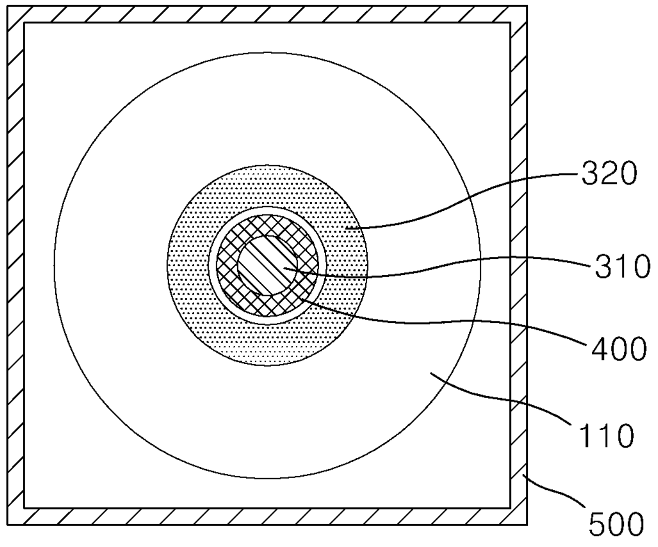
FIG. 10 is a front cross-sectional view of a speaker driver from which surrounding (suspension) has been omitted according to a sixth embodiment of the present invention.

FIG. 10 is a front cross-sectional view of a speaker driver from which surrounding (suspension) has been omitted according to a sixth embodiment of the present invention.

The speaker driver from which surrounding (suspension) has been omitted according to the sixth embodiment may have been applied and improved from the fifth embodiment.

According to the sixth embodiment, the magnet unit 300 may be disposed in the main part 110. That is, the extension part 120 of the vibration unit 100 may not be present.

The first magnet unit 310, the second magnet unit 320, and the winding unit 400 disposed in the extension part 120 according to the fifth embodiment may be disposed in the main part 110. Accordingly, according to the sixth embodiment, the main part 110 of the present invention does not move in response to a movement of the extension part 120, but the main part 110 may have a form that moves in response to a sliding movement of the second magnet unit 320.

Figure 11:
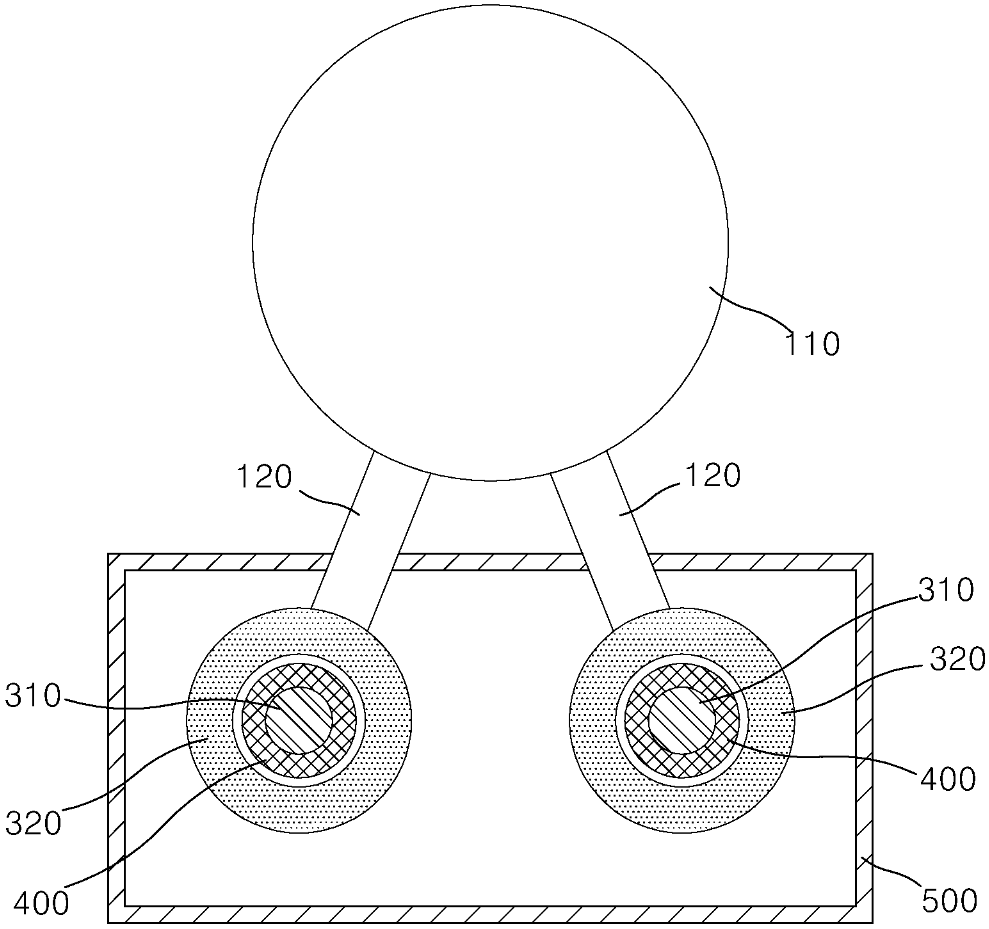
FIG. 11 is a front cross-sectional view of a speaker driver from which surrounding (suspension) has been omitted according to a seventh embodiment of the present invention.

FIG. 11 is a front cross-sectional view of a speaker driver from which surrounding (suspension) has been omitted according to a seventh embodiment of the present invention.

The speaker driver from which surrounding (suspension) has been omitted according to the seventh embodiment may have been applied and improved from the fifth embodiment.

In the speaker driver from which surrounding (suspension) has been omitted according to the seventh embodiment, the first magnet unit 310, the second magnet unit 320, and the winding unit 400 may be configured in plural number to support one vibration unit 100. Accordingly, the vibration unit 100 can stably generate a high-quality sound because the vibration unit can be stably supported and vibrate.

Meanwhile, each of the speaker drivers from which surrounding (suspension) has been omitted according to the first to seventh embodiments may include a housing 500. In this case, it is preferred that the housing 500 has a form in which the main part 110 of the vibration unit 100 is exposed to the outside and the winding unit 400 and the magnet unit 300 are disposed therein.

For example, according to the first and second embodiments of the present invention, it is preferred that the housing 500 is disposed within the housing 500 up to a portion where the tilt connection unit 200 is formed. Accordingly, the tilt connection unit 200 is fixed to the housing 500, and the main part 110 may move from the outside of the housing 500 in the first direction or the second direction with respect to the tilt connection unit 200, and may vibrate and generate a sound to the outside.

For example, each of the third and fourth embodiments may include a plurality of housings 500. That is, the housing 500 may include a first housing and a second housing. The first housing is disposed on the part of the length unit 130. That is, it is preferred that the housing 500 is disposed between the first extension part 121 and the second extension part 122 and disposed in a form to surround the magnet unit 300. The second housing has the first extension part 121 and the second extension part 122 disposed therein, but the main part 110 may not be disposed within the housing 500.

Each of the remaining embodiments may include the housing 500 within which the first magnet unit 310, the second magnet unit 320, the winding unit 400, etc. are disposed. In this case, it is preferred that the housing 500 is formed to be at least greater than both ends of the first magnet unit 310. The second magnet unit 320 may include a guide that guides the side of the extension part 120 in a way that the first magnet unit 310 can slide and move.

Furthermore, in the present invention, a damper may be disposed within the housing 500. In this case, it is preferred that the damper is disposed to be attached to the housing 500 in order to prevent the housing 500 and the vibration unit 100 from coming into contact with each other. However, an important thing is that the damper needs to be disposed at a location where a movement of the vibration unit 100 is not hindered. For example, according to the fourth embodiment, the damper needs to be disposed at a place where the housing 500 comes into contact with both ends of the first magnet unit 310. In this case, the damper may function to prevent the vibration unit 100 from colliding against the housing 500, but does not hinder a movement of the vibration unit 100 like a suspension.

Figure 12:
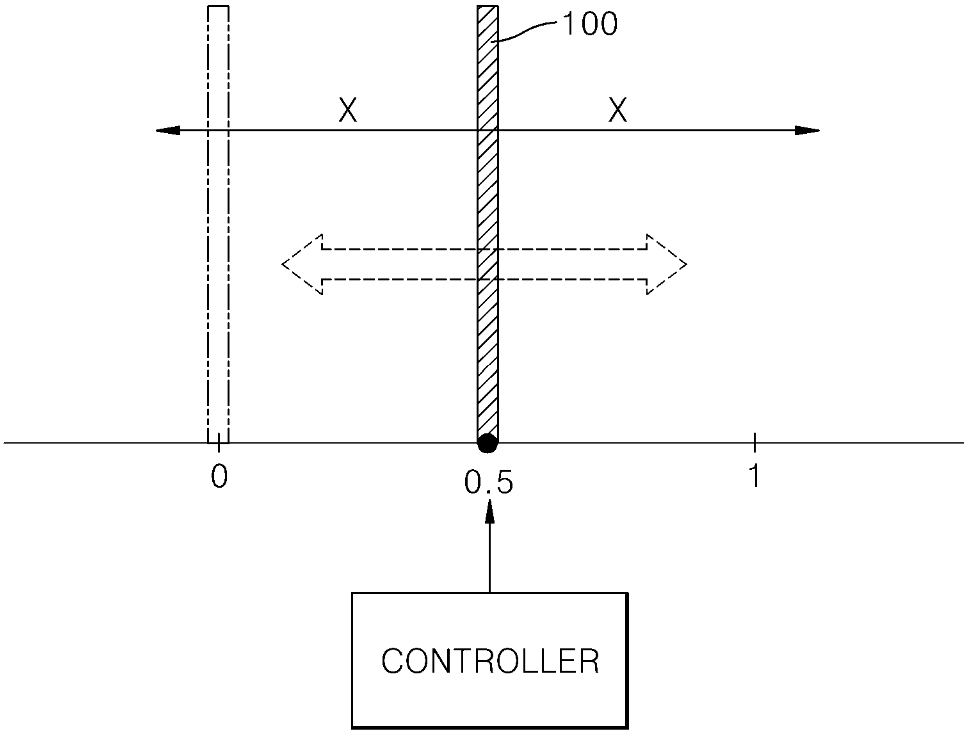
FIG. 12 illustrates an operation of a controller according to an embodiment.

FIG. 12 illustrates an operation of a controller according to an embodiment.

Furthermore, the speaker having improved sound quality according to the first to fifth embodiments includes a controller 600.

The present invention is characterized in that a suspension is not present. Accordingly, the vibration unit 100 needs to be disposed at a home position. If the vibration unit 100 is not disposed at the home position, sound quality is degraded. For example, the vibration unit 100 can generate a high-quality sound only when the vibration unit 100 repeatedly moves and vibrates from a location−1 to a location+1. However, when power is applied in the state in which the vibration unit 100 has been disposed at a location+0.5 from the beginning, a low-quality sound may be generated because a moving distance and location of the vibration unit 100 may be distorted.

The present invention has solved such a problem through the controller 600 and an inaudible frequency signal.

The inaudible frequency signal is a frequency having a high number of vibrations or a low number of vibration bands, and is a sound inaudible to the human ear. The vibration unit 100 moves at a small distance finely and repeatedly. Accordingly, in the inaudible frequency signal, the vibration unit 100 may be viewed by the human eye as if it looks like being stopped, and may be viewed by the human eye as if it looks like being stopped because a sound is inaudible. In the present invention, based on the fact, when the vibration unit 100 needs to be disposed at its home position, the controller 600 generates a zero-point control signal, that is, power corresponding to an inaudible frequency signal, and applies the power to the winding unit 400. The winding unit 400 receives the signal and applies a force to the vibration unit 100 so that the vibration unit 100 is placed at the zero point. Accordingly, the vibration unit 100 may be disposed at its home position.

Furthermore, the controller 600 may generate a location arrangement signal. The location arrangement signal is used when it is necessary to intentionally change a location of the vibration unit 100. In this case, the controller 600 may intentionally manipulate the vibration unit 100 so that the vibration unit 100 is disposed at a location other than a preset zero point. In this case, the controller 600 generates the location arrangement signal and generates power in response thereto. The vibration unit 100 that has received the power is disposed at a location corresponding to the power. Accordingly, the present invention can intentionally change quality of a sound.

Although specific embodiments of the present invention have been illustrated and described, it will be evident to a person having common knowledge in the art that the present invention may be modified and changed in various ways without departing from the technical spirit of the present invention provided by the claims.

The invention claimed is:

1. A speaker driver from which a suspension has been omitted, the speaker driver comprising:
- a magnet unit disposed in a position;
- a vibration unit disposed adjacent to the magnet unit and configured to generate sound through vibration;
- a winding unit disposed in a coiled configuration between the magnet unit and the vibration unit, generating magnetism in a first direction or a second direction which is opposite to the first direction when power is supplied to the winding unit, and vibrating the vibration unit by applying, to the vibration unit, a force generated in association with the magnetism of the magnet unit; and
- a controller configured to control a magnitude of the power supplied to the winding unit,
- wherein the controller is configured to generate a zero-point control signal corresponding to an inaudible frequency signal in order for the vibration unit to vibrate in an inaudible frequency band, and to supply power corresponding to the zero-point control signal to the winding unit in order to place the vibration unit at a zero point.

2. The speaker driver of claim 1, further comprising:
- an installation unit formed at a fixed position of the vibration unit; and
- a tilt connection unit disposed in the installation unit,
- wherein when power is supplied to the winding unit, the vibration unit is tilted based on the tilt connection unit.

3. The speaker driver of claim 2, wherein:
- the vibration unit comprises a main part whose one surface and another surface have a symmetrical shape and an extension part connected to the main part and having a shape elongated in one direction, and
- the installation unit is formed in the extension part.

4. The speaker driver of claim 2, wherein:
- the installation unit comprises a hole penetrating the vibration unit, and
- the tilt connection unit is disposed to penetrate the hole.

5. The speaker driver of claim 1, further comprising:
- an arrangement unit formed at a location of the vibration unit facing the magnet unit,
- wherein the winding unit is disposed in the arrangement unit.

6. The speaker driver of claim 1, wherein the magnet unit has a round form.

7. The speaker driver of claim 1, wherein:
- any one of the magnet unit or the winding unit is disposed within the other of the magnet unit or the winding unit,
- the vibration unit comprises extension parts arranged in parallel and elongated from locations isolated from each other, and
- the extension parts are configured in a way that a force of the winding unit is applied to the extension parts.

8. The speaker driver of claim 7, wherein:
- the vibration unit comprises a length unit connected to the extension parts,
- the winding unit is disposed in a form surrounding the length unit, and
- the magnet unit is disposed in a form surrounding the winding unit.

9. The speaker driver of claim 8, wherein the vibration unit is configured to be tilted based on the length unit.

10. The speaker driver of claim 1, further comprising:
- an arrangement unit formed on one side of the vibration unit,
- wherein the magnet unit and the winding unit are disposed in the arrangement unit, and
- wherein when power is applied, a force is applied to the arrangement unit so that the vibration unit vibrates.

11. The speaker driver of claim 10, wherein:
- the magnet unit comprises a first magnet unit and a second magnet unit,
- the second magnet unit has a hollow unit capable of accommodating the first magnet unit, and the hollow unit has a greater diameter than the first magnet unit, and
- the winding unit is positioned between the first magnet unit and the second magnet unit.

* * * * *